United States Patent [19]

Görlich

[11] Patent Number: 4,880,606

[45] Date of Patent: * Nov. 14, 1989

[54] METHOD AND APPARATUS FOR DESULFURIZATION OF SULFUR OR HYDROGEN SULFIDE-CONTAINING GASES

[75] Inventor: Lothar Görlich, Dissen a.T.W., Fed. Rep. of Germany

[73] Assignee: UTB Umwelttechnik Buchs AG, Buchs, Switzerland

[ * ] Notice: The portion of the term of this patent subsequent to Oct. 17, 2006 has been disclaimed.

[21] Appl. No.: 222,263

[22] Filed: Jul. 21, 1988

Related U.S. Application Data

[63] Continuation-in-part of Ser. No. 188,742, Apr. 28, 1988.

[30] Foreign Application Priority Data

Oct. 11, 1985 [CH] Switzerland ............... 4394/85

[51] Int. Cl.$^4$ ............................................. C01B 17/05
[52] U.S. Cl. .................... 423/220; 423/224; 423/567 R; 423/573.1; 55/73; 210/673; 210/721
[58] Field of Search ............... 423/220, 232, 234, 226, 423/573.1, 575, 224; 55/73

[56] References Cited

U.S. PATENT DOCUMENTS

| | | | |
|---|---|---|---|
| Re. 17,162 | 12/1928 | Leuchtenberg | 423/573.1 |
| 3,388,057 | 6/1968 | Callahan | 423/573.1 |
| 3,956,473 | 5/1976 | Mimoun et al. | 423/573.1 |
| 4,041,142 | 8/1977 | Moore | 423/573.1 |
| 4,390,516 | 7/1983 | Blytas | 423/573 R |
| 4,496,371 | 1/1985 | Urban | 423/232 |
| 4,532,117 | 7/1985 | Delaney | 423/226 |
| 4,532,118 | 7/1985 | Tajiri et al. | 423/226 |
| 4,664,903 | 5/1987 | Becker et al. | 423/574 L |

*Primary Examiner*—Anthony McFarlane
*Attorney, Agent, or Firm*—Frishauf, Holtz, Goodman & Woodward

[57] ABSTRACT

The Takahax gas desulfurization method is rendered more energy-efficient and compact by providing separate scrubbing and regeneration loops operating from a common reservoir (31,33) and by using hyperbaric pressure in the oxygenating or regenerator vessel (59). The overall height of a plant of comparable capacity can be reduced from the 13 meters (about 40 feet) required by the prior art to 3.3 meters (10 feet) and can therefore be transported by truck. The preferred washing or scrubbing liquid is an alkaline solution using sodium 1,4 napthoquinone-2-sulfonate as the catalyst. By oxidation, elemental sulfur is made to precipitate and this is filtered out continuously in a filter (77). Regenerated washing liquid flows via a degassing vessel (69) into the common reservoir (27,31,33). In the degassing vessel, under relaxed pressure, degassing occurs, and the sulfur foam, along with the oxygen or air it contains, is returned via a pump (55) to the regenerator pressure vessel (59) or to the filter (77).

20 Claims, 1 Drawing Sheet

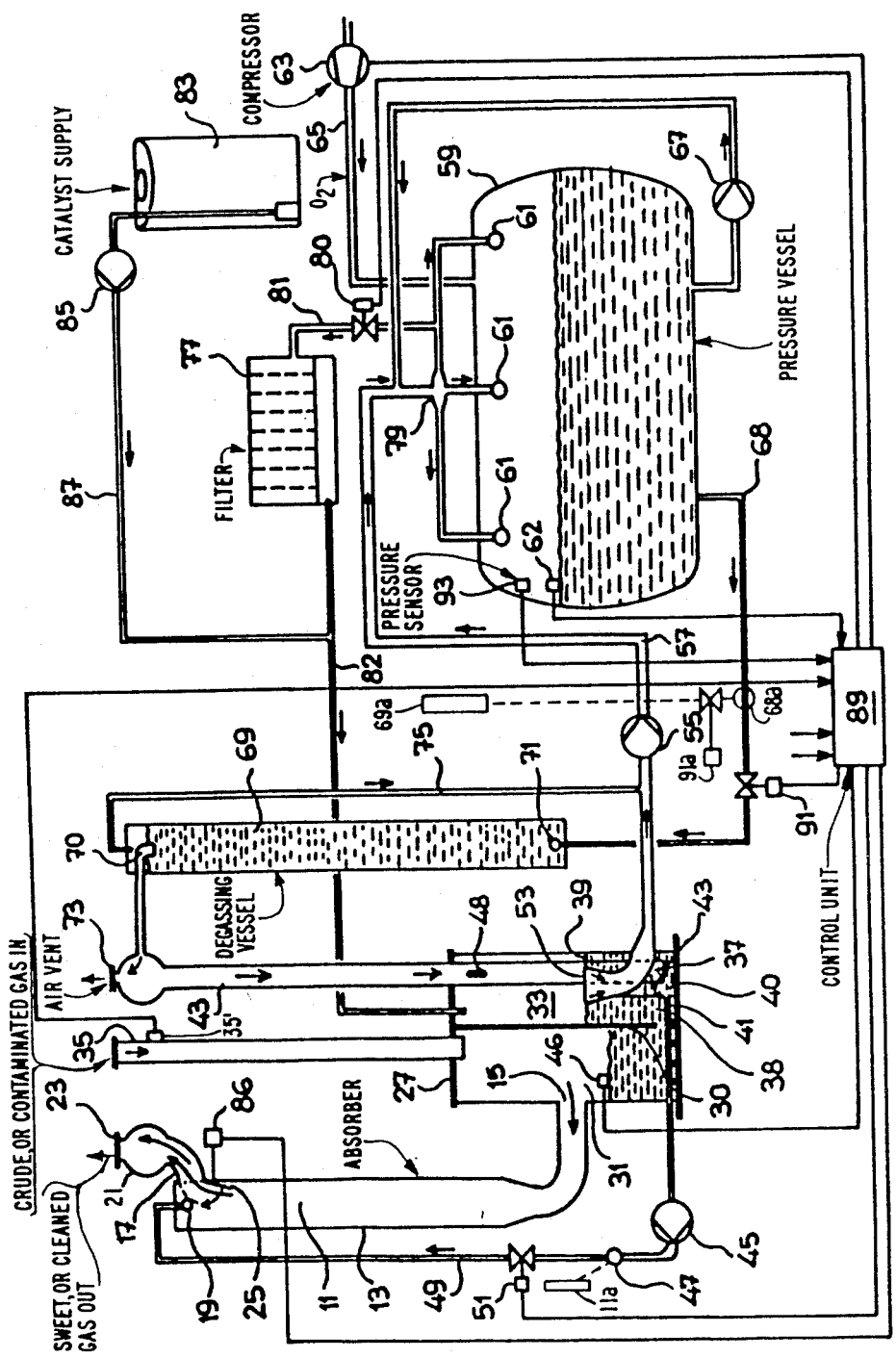

METHOD AND APPARATUS FOR DESULFURIZATION OF SULFUR OR HYDROGEN SULFIDE-CONTAINING GASES

This is a continuation-in-part of Ser. No. 188,742 filed Apr. 28, 1988, now pending.

The present invention relates to a method and an apparatus or plant to remove sulfur or hydrogen sulfide from gases, and especially from sludge gas, sewer gas, gas evolved during biodegradation of organic substances, natural gas, coal gas, or, in general, any gases which contain sulfur. Such gases may have considerable utility when free from sulfur or hydrogen sulfide content. Coal gas is gas derived from destructive distillation of coal.

BACKGROUND

In their crude state, many gases used today as sources of energy contain sulfur compounds, in particular hydrogen sulfide. This is also true of sludge gas. Sludge gas, which is often also called sewer gas, is evolved in the anaerobic treatment of sludge. In closed towers, sludge is treated with microbes to convert it into a form in which it is environmentally harmless. In this process, up to 25 cubic meters of sludge gas or sewer gas—that is, a methane gas having a calorific value of nearly 23,000 KJ/m$^3$, is produced per cubic meter of raw sludge. This methane gas is highly suitable for use in gas motors, to generate power from heat in sewage treatment plants, and for being combusted in gas burners used in heating sewage treatment towers and buildings, and after suitable processing it can also be fed into the public utility gas supply network. In each of these applications, however, using gas that contains sulfur is problematic. For instance, if the gases are combusted in internal combustion engines (ICE's) or gas burners, highly corrosive sulfur compounds such as $H_2SO_3$ or $H_2SO_4$ are produced. Accordingly, the necessary equipment must be made of corrosion-resistant materials, or else considerable repair and maintenance costs due to corrosion damage must be expected. On environmental protection grounds, it is furthermore undesirable, or even illegal, to emit sulfur-containing exhaust gases into the atmosphere.

To avoid these problems, the gases, such as the sludge gas produced in sewage treatment plants, are typically desulfurized in gas desulfurization plants. Such plants operate by either what is known as the dry process or what is known as the wet process. In the dry process, the hydrogen sulfide is converted with a solid cleaning composition, such as ferric hydroxide or Fe(OH)$_3$, into FeS and $H_2O$, after which the cleaning composition can be regenerated by oxidation. The sulfur is removed along with a portion of the cleaning composition and disposed of at special waste disposal sites. The used cleaning composition must be replaced.

In the wet process, the gas that is to be cleaned is washed with a liquid, and soluble sulfur compounds are formed in the liquid by chemical reaction. The liquid is then aerated with air or pure oxygen to oxidize the sulfur compounds. Depending on the chemicals used in the washing solution, gypsum (CaSO$_4$) or ammonium sulfate ((NH$_4$)$_2$SO$_4$), for instance, is formed, or the sulfur is precipitated out in a virtually chemically pure state. The liquid from which the sulfur has been removed can then be used again as washing liquid for the gas that is to be cleaned. The washing liquid as a rule contains additives that catalytically enable specifically filtering out the sulfur or its chemical compounds.

One wet process that is already known is called the Takahax process. In this process, the hydrogen sulfide is removed from the crude gas in a vertical container by spraying an alkaline liquid from the upper end of the container, through which the gas flows in a countercurrent to the falling droplets. The subsequent oxidation of the sulfur compounds is effected in tall upright cylindrical containers. These containers are open at the top and are filled with the more or less saturated liquid from the washing step. Compressed air is blown in large bubbles into this liquid through perforated pipes located on the bottom of the container. Oxidation occurs as the air bubbles rise to the surface of the liquid. The speed of the reaction is known to be dependent not only on the catalyst-specific energy potential and on the temperature, among other factors, but also substantially on the size of the contact surfaces between the air bubbles and the liquid. During the oxidation, elemental sulfur is liberated, some of which appears in the form of foam in an air filter above the oxidation vessel, where it is removed by a removal device. The sulfur is then filtered out in a filter, and the resultant liquid can be returned to the washing step along with the other regenerated liquid. (See the above-referenced article by Hasebe in the journal gwf: Das Gas- und Wasserfach.)

The great disadvantage of the Takahax process is that it requires complex and expensive apparatus and involves high capital investment and energy costs. For example, a Takahax plant was built in 1978 for a waste water treatment plant near Tokyo; it reduces the hydrogen sulfide content in 150 m$^3$/h of sludge gas from 0.5% by volume to about 0.05% by volume. This plant requires a washing tower 1.7 m in diameter and 13 m high, as well as an oxidation tower 1.3 m in diameter and 9 m high. Accordingly, the volume of the plant is approximately 42 m$^3$, and approximately 15 m$^3$ of washing liquid are required for the initial filling of the system.

In the Takahax process, an alkaline solution is used as the washing liquid, normally in combination with sodium 1,4-naphthoquinone-2-sulfonate as the catalyst.

THE INVENTION

Briefly, the object of the invention is a method for use in an apparatus for desulfurizing gas containing sulfur or hydrogen sulfide that does not require complex and expensive equipment and that occupies relatively little space.

A feature of the invention relates to a method of desulfurization of gas containing hydrogen sulfide in which the gas is washed in a liquid that circulates in a loop; sulfur compounds are formed in the liquid and then, to oxidize these compounds, the liquid is aerated with air or pure oxygen, and the sulfur thereby produced is precipitated out of the liquid, and the liquid from which the sulfur has been removed is returned to the loop once again. Preferably, the liquid is an alkaline solution having sodium 1,4-naphthoquinone-2-sulfonate as the catalyst.

In accordance with a feature of the invention, the aeration of the liquid takes place at a pressure that is higher than the ambient pressure, and after the aeration the liquid is degassed before being returned to the circulating loop.

With this embodiment of the method, it is possible to build a very compact plant for performing the method. As a general rule, a method that operates at pressure above atmospheric pressure requires more complex and expensive apparatus. Counter to what would normally be expected, this is not the case with the method according to the invention, as will be explained more fully below.

Advantageously, the pressure during aeration is about 2 bar. A pressure on this order of magnitude requires less-complicated and less-expensive apparatus and yields very good results. For aeration, the liquid is advantageously introduced into a pressure vessel or hyperbaric chamber into which air or pure oxygen is also pumped.

In a preferred mode, the liquid in the pressure vessel is recycled continuously. This increases the rate at which the oxygen is dissolved in the liquid and accelerates the oxidation process. The liquid is advantageously atomized in the space above the level of liquid in the pressure vessel when it is recycled. It is advantageous for the aeration to be performed in a horizontal cylindrical pressure vessel that is filled practically halfway with liquid. This further increases the diffusion surface area, which also promotes fast oxidation, or rapid precipitation of elemental sulfur.

A portion of the liquid can be continuously withdrawn from the circulating loop, or circuit, and carried, for instance by a branch circuit, to a filter device for filtering out the sulfur and then returned to the loop once again. In this manner, continuous removal of the settled-out sulfur is attained.

The quantity of liquid removed from the circulating loop per unit of time is suitably regulated as a function of the quantity of gas pumped per unit of time. Energy economy is enabled thereby, since less pump energy is required.

A further feature of the invention relates to an apparatus for performing the method, having at least one exchange vessel or absorber space with a gas inlet and a gas outlet, means for distributing the cleaning fluid in the absorber, an oxidizing vessel, means for introducing air or pure oxygen into the oxidizing vessel, means for removing the sulfur from the oxidizing vessel, and means for returning liquid from the oxidizing vessel into the absorber.

In accordance with a further feature of the invention, the oxidizing vessel is a hyperbaric pressure vessel, and means are provided for maintaining a predetermined pressure in the pressure vessel; the means for returning liquid from the oxidizing vessel into the absorber include a degassing apparatus for degassing the returned liquid.

This apparatus is simple in design and can be substantially smaller in dimension than known apparatus. As a result, there is a substantial cost savings. Savings are also attainable in operation of the apparatus, because the energy requirement is relatively small in comparison with known plants that require a large volume of liquid.

The degassing apparatus is preferably formed by at least one pressure relaxation vessel or column, which is connected at its bottom to the pressure vessel containing the solution and has an outlet at its top by way of which the regenerated liquid can flow to the absorber either directly or via a storage container. In the pressure relaxation vessel, gas that is dissolved in the liquid is removed. By the flotation effect, floating sulfur particles are carried upward, and from there they can be removed in the form of sulfur foam. A suction line for aspirating sulfur foam from the pressure relaxation vessel is therefore advantageously provided, leading to the pressure vessel containing solution or to a filter device. If the sulfur foam is carried to the pressure vessel, then the same pump that pumps liquid from the absorber to the pressure vessel can also serve as the suction device. An advantage here is that the pure oxygen or air contained in the sulfur foam is returned to the pressure vessel and hence is again available for the oxidizing process.

The storage vessel is advantageously divided into two chambers by a partition extending from its top to the vicinity of its bottom, the first chamber having an inlet for liquid from the absorber and the second chamber communicating with the outlet of the pressure relaxation vessel and having both an outlet to the absorber and an outlet to the pressure vessel. The first chamber therefore mainly contains used washing liquid, and the second chamber mainly contains regenerated liquid. The outlet to the absorber is advantageously located at the bottom of the second chamber. Contrarily, the outlet to the pressure vessel is advantageously disposed above and spaced apart from the outlet to the absorber. The outlet for liquid leaving the absorber is advantageously formed by an overflow means, such as a funnel. By way of this overflow, sulfur foam floating on the surface can then be removed as well.

An outlet pipe advantageously extends from the outlet of the pressure relaxation vessel into a further chamber in the vicinity of the outlet to the absorber. This assures that to the maximum possible extent only regenerated liquid is used as washing liquid. The upper portion of the second chamber communicates with the atmosphere, for instance via an opening in the outlet pipe. This assures that excess pressure, for whatever reason or from whatever source, can never build up in the second chamber.

It is possible to provide an increased number of absorbers and/or an increased number of pressure relaxation vessels, and in that case, means are provided for putting absorbers and/or pressure relaxation vessels into or out of action in accordance with the quantity of gas to be cleaned per unit of time. This enables simple adaptation of the plant to changes in gas production.

Means for distributing the liquid are suitably located in the pressure vessel. It is also suitable to provide means for recirculating the liquid in the pressure vessel. Rapid and adequate aeration of the liquid is thereby attained. Means for regulating the level of the liquid in the storage container and/or in the pressure vessel are suitably provided as well. This assures that the level of liquid is always optimal for performing the method. A control valve is suitably provided for controlling the quantity of liquid flowing to the filter per unit of time. This enables suitable performance of the method.

DRAWING

The single FIGURE schematically shows the system of the invention.

DETAILED DESCRIPTION

The desulfurizing plant has at least one exchange vessel 11, usually termed an absorber, which in the exemplary embodiment shown is formed by a vertically arranged column 13. The absorber 11 has a gas inlet 15 at the bottom and a gas outlet 17 at the top. Means 19 are provided at the top of the column 13 for distributing a liquid; these may for instance be a spray nozzle or a motor-driven propeller at which a stream of liquid is aimed. A large number of columns 13 may be provided, their outlets 17 being interconnected via a pipe 21 and leading to a common outlet 23 for sweet, or cleaned, gas. One flap 25 is then provided for each column 13, with which the column 13 can be put into or taken out of action.

A closed storage container or reservoir 27 serves to store the liquid used for washing. A partition 30 is arranged in the storage container 27, extending from the top to near the bottom and dividing the storage container or reservoir 27 into two chambers 31 and 33. The two chambers 31, 33 then act as a comminuting reservoir or communicating vessels for the liquid contained in them. This arrangement was selected so as to separate the chamber 31, which is subject to possibly fluctuating gas pressure, from the chamber 33 that is at atmospheric pressure. At the same time it is assured that the liquid entering the chamber 31 from the absorber 11 can flow on into the chamber 33 unhindered.

It should be noted that the gas that is to be cleaned flows via the line 35 into the chamber 31 and from there into the absorber 11.

The chamber 33 is divided by a further partition 37 into two compartments 38, 40. The partition 37 is only high enough, however, that it extends from the bottom of the chamber 33 to the vicinity of the surface 39 of the liquid. The outlet 41, through which liquid flows out in a first loop of the compartment 40 to the absorber 11, is located at the bottom of the chamber 33 at the second partition 37, very close to the end of the duct or pipe 43 through which regenerated liquid flows in a second loop into the storage container 27. This assures that virtually only regenerated liquid is pumped by the pump 45 into the absorber 11. The level of liquid in the chamber 31 is monitored by the level sensor 46, which is connected to the control unit 89. The second chamber 33 communicates with the atmosphere via an opening 48 in the duct or pipe 43. This assures that pressure in excess of atmospheric pressure cannot build up in the second chamber 33.

Depending on plant capacity, more than one exchange vessel 11 may be used. If so, and when a plurality of exchange vessels are used as schematically shown by vessel 11a, a cross connection is provided from a junction 47. The cross connection is shown schematically be a broken line in the FIGURE. Each one of the vessels 11, 11a, and such further vessels as may be connected to junction 47, are supplied through respective lines 49 from the junction 47. Each vessel 11, 11a, and such further vessels as may be used, have an individual control valve 51 included in the respective line 49. The valve or valves 51 are respectively controlled from a control unit 89, as will appear more fully below.

The outlet 53 from the storage container 27 for the liquid that is to be regenerated is located spaced apart from the outlet 41 and is formed as an overflow from the chamber 33. This overflow 53 may for instance take the form of a funnel. Via this overflow 43, not only liquid but also the sulfur foam floating on the surface is removed from the chamber 33. A pump 55 pumps the liquid flowing into the overflow 53 through the line 57 into the regenerator, or oxidizing vessel, 59. At least one distributor device 61 is provided, for finely spraying the liquid. In the exemplary embodiment shown, three nozzles 61 are provided to distribute the liquid.

In accordance with a feature of the invention, the oxidizing vessel, or regenerator, 59 is formed as a pressure vessel. It is preferably cylindrical and is arranged horizontally, that is, lying on its side. It is filled such that the surface of the liquid is located approximately in the horizontal axis of the vessel, and thus has the largest possible suface area. This is monitored by the level sensor 62. The volume of the vessel above the surface of the liquid is kept at a constant excess pressure, preferably about 2 bar or somewhat higher, with air or pure oxygen. To this end, a gas compressor 63 is provided, which pumps air or pure oxygen in the gas phase into the pressure vessel 59 via the line 65. The liquid located in the vessel is pumped out in a third loop continuously by the circulating pump 67 and returned to the pressure vessel again via the nozzles 61. As a result, frequent contact of the liquid with the oxidizing medium, that is, the air or oxygen, is attained.

Dissolving a gas in a liquid is a purely physical process. In this process, the gas molecules come into more or less frequent contact with the surface of the sprayed liquid as a function of their increased number of particles per unit of time in the excess pressure chamber of the vessel 59 and as a function of their molecular motion (that is, their temperature). From the surface, the gas molecules migrate into the interstices of the lattice-like molecular structure of the liquid and fill up these interstices. Since the chemical reaction time of the oxidation of the sulfur compounds is a function of the possible oxygen diffusion depth per unit of time, the reaction time is accelerated considerably both by the pressure and by the increase in contact surface area, in particular between the liquid and the gas. A sharp increase in the contact surface area is attained as a result of the spraying of the liquid.

For returning regenerated liquid from the regenerator 59 to the absorber 11, the line 68 is used, which leads to a degassing vessel or column 69, from which the now degassed liquid flows via the duct or pipe 43 into the storage container 27 and from there reaches the absorber 11.

In the exemplary embodiment shown, the degassing vessel or column 69 is formed as a pressure relaxation, or release, vessel or column, which has a for instance spherical nozzle head 71 at its bottom having a large number of nozzles. At its top, the pressure relaxation vessel 69 has an outlet 70 into the duct or pipe 43, which is open at the top so that the removed gas which has not already been removed along with the foam via a line 75 can escape through the opening 73. At the same time, the opening 73, together with the opening 48 in the duct or pipe 43, serves as a safety outlet for the chamber 33 and effects an atmospheric pressure equilibrium in the event of possible fluctuations in the liquid level in the chambers 31 and 33. This is particularly necessary if the gas pressure in the chamber 31 fluctuates. The sulfur foam that forms at the top of the pressure relaxation vessel 69 is aspirated out with the excess gas via the line 75 and is delivered to the pressure vessel 59 by the pump 55. However, the sulfur foam could also be delivered directly to a filter device 77 so as to remove water from it.

From the line 79 that leads to the nozzles 61, a line 81 branches off and leads via a valve 80 to the filtering device 77. There, the sulfur that has been settled in the liquid is filtered out. The filtered liquid then flows via the line 82 into the storage container 27. A filter press, a vacuum filter or a filter bag may for instance be used as the filter device 77. The valve 80 may be controlled in accordance with the gas throughput measured by a flow meter 86. The flow meter 86 is coupled to the absorber, or exchange vessel 11.

The unavoidable loss of chemicals and catalyst in the filtration of the liquid, in the form of moisture in the press cake, leakage or evaporation in the circulating loop, is automatically made up for by means of a metering station 83. The pump 85 introduces the chemicals into the line 82 via the line 87.

A control and monitoring unit 89 is used for automatic operation of the plant. The control unit receives information on the quantity of gas supplied to the plant per unit of time, for instance, and in accordance therewith puts absorber vessels 13 and pressure relaxation vessels 69 into or out of action by actuating the valves 51, 91 and the flaps 25. A pressure sensor 93 may be provided in the pressure vessel 59, to provide the control unit 89 with pressure values so that it will control the gas compressor 63. The level of liquid in the storage container 27 is also measured and regulated by the level sensor 46, while the level in the vessel 59 is measured and regulated by the level sensor 62.

The desulfurization apparatus can be very compact in structure. A plant has been built that has the same output as the Japanese plant mentioned earlier, but has a substantially smaller apparatus volume of only about 5.5 m$^3$. The initial filling of the system takes about 2 m$^3$ of liquid. Since the entire apparatus is only 3.5 m long and 2.4 m wide and 3.3 m high, it can be assembled on site and can be safely transported in traffic using a conventional highway vehicle. This is possible for plants having an output of up to approximately 220 m$^3$/h of crude, or contaminated, gas.

OPERATION

The crude gas flows via the line 35 into the chamber 31 and from there flows upward in the exchange vessel or absorber 11. At the same time, the pump 45 supplies washing liquid to the spray apparatus 19, so that a drizzle of liquid drops downward in the absorber 11. Thus the gas and the liquid move in countercurrent in the absorber 11, and the hydrogen sulfide is removed from the gas by the droplets of washing liquid. The liquid collects in the chamber 31.

The liquid now contains a soluble sulfur compound, which is dependent on the chemical reaction involved. From the chamber 31, the liquid flows into the chamber 33 and from there via the overflow 53, the pump 55 and the line 57 to the nozzles 61 in the regenerator vessel 59.

In accordance with the invention, the vessel 59 is a pressure vessel. Under the influence of the oxygen-containing atmosphere prevailing there, the sulfur compound contained in the liquid is oxidized, so that elemental sulfur settles out. Since the liquid in the pressure vessel 59 is continuously recycled by the circulating pump 67, the liquid becomes well aerated. Furthermore, a partial flow of liquid, which is adjustable with the valve 80, is also delivered via the line 81 to the filtering device 77, which removes the settled-out sulfur. The filtered liquid then flows back into the chamber 33 via the line 82. Predominantly oxidized liquid flows via the line 68 into the pressure relaxation vessel 69.

In accordance with a feature of the invention, relaxation, or release of pressure, results in a large number of very fine bubbles (the diameter amounts to approximately 150 μm), which rise in the column and carry fine sulfur particles along with them to the surface. Since the liquid in the relaxation vessel is still, at least in the lower part of the vessel, very high in oxygen content, the oxidizing process continues in the relaxation vessel as well with relatively high intensity. This intensity of oxidizing is still greater than in the oxidizing vessel of known plants, because the liquid in the relaxation vessel is still more highly saturated with oxygen than is that in the oxidizing vessels of the known plants, where because of the large-bubble aeration method used there it is impossible to attain a high degree of saturation of the liquid with oxygen.

The sulfur foam produced in the relaxation vessel 69 is aspirated out via the line 75 and by the pump 55. The process losses of chemicals and catalyst are made up by means of the metering station 83, by furnishing chemicals and catalyst to the storage container 27 with the pump 85, via the line 87 and the line 82. The control of the apparatus is effected by the control unit 89, which actuates the valves 51 and 91 and flaps 25 as needed, that is, as a function of the quantity of gas furnished, so as to put absorber columns 13 and/or relaxation vessels 69 into play or take them out of action accordingly.

More than one degassing vessel 69 may be provided, as shown schematically by a further vessel 69a. Vessel 69a can be connected to a junction 68a in line 68 and controlled by a valve 91a, which, in turn, is connected by suitable control lines (not shown) to the control unit 89. Each of the additional degassing vessels 69a, and such other vessels as may be used, can be connected to the inlet of the pumps 55 by ducts similar to duct 75, or coupled to duct 75. The cleaned fluid from the various degassing vessels is returned, for example in common, to the duct or pipe 43.

In a preferred embodiment of the method of the present invention, respective first, second, and third flow rates of washing liquid, through the absorber or scrubbing column 11, the regenerator 59, and the degasser or desorber 69 differ, in that the latter two flow rates are greater, i.e. washing liquid flows through the regenerator 59 multiple times for each time the washing fluid is used for scrubbing. This permits more complete regeneration (sulphur removal) of the washing fluid before re-use, and facilitates reduction in size of the regeneration and degassing apparatus relative to the scrubbing apparatus. Flow rate may be defined in terms of volume per time, e.g. liters per minute. Particularly advantageous ratios for the respective flow rates are approximately 1:5:3, that is, the (second) flow rate through regenerator 59 is 5 times the (first) flow rate through absorber 11, and the (third) flow rate through desorber 69 is about 3 times the (first) flow rate through absorber 11, or 3/5 the (second) flow rate through regenerator 59. The flow rate through regenerator 59 can be greater than through desorber 69 because some fluid (having a fourth flow rate) is drawn off the bottom of regenerator 59 through outlet 67 and is recycled or sprayed back into the regenerator through nozzles 61 before finally leaving again through outlet 68 enroute to desorber 69. This is made possible by the structure shown in the FIGURE, in which a common washing liquid reservoir 31, 33 is used, but the respective circulating loops to the absorber 11, and to the regenerator 59 and desorber 69 are separate.

It is not critical that the exact ratios discussed above be maintained; depending upon the dimensions of the particular installation, it is believed that a regenerator/absorber flow rate ratio in the range from about 2 to about 5 would provide acceptable results and that a regenerator/desorber flow rate ratio in the range from about 1.2 to about 5 would provide acceptable results.

Some washing fluid also passes around a fifth loop, from line 57 into line 81, through filter 77, and return line 82, at a fifth flow rate. Normally, this fifth flow rate need not exceed one-third of the (third) flow rate through degasser 69.

According to a further feature of the preferred embodiment, the hyperbaric pressure in regenerator 59 is in the range of about 1.2 to 2.5 bar, for example 1.3 to about 2.5 bar, and especially about 1.3 bar to about 2.2 bar, with 1.8 bar preferred. Using more than 2.2 bar pressure consumes more energy for running the compressor for the oxygenating gas, without significantly improving regeneration, while using less than about 1.3 bar insufficiently improves performance, compared to results obtained at normal atmospheric pressure of 1 bar.

Various changes and modifications may be made within the scope of the inventive concept.

I claim:

1. Method of desulfurization of gas contaminated with sulfur
   comprising the steps of
   providing a reservoir (27; 31, 33) of washing or scrubbing liquid;
   feeding said contaminated gas through an absorber (11) while simultaneously circulating a portion of said washing liquid at a first flow rate in a first loop comprising a scrubbing loop including a recirculating stream from said reservoir (27, 31) through said absorber (11) and back into said reservoir, thereby forming contaminated liquid including sulfur compounds;
   circulating a portion of said contaminated washing liquid from said reservoir at a second flow rate in a second loop comprising regenerating loop including a recirculating stream from the reservoir (27; 33) to a regenerator (59) and back to the reservoir, wherein said second flow rate exceeds said first flow rate,
   thereby oxidizing said sulfur compounds to form elemental sulfur, removing said elemental sulfur from said liquid, and thereafter circulating said liquid back into said reservoir, and wherein said oxidizing includes aerating the contaminated washing liquid in the regenerator with an oxygen-containing gas.

2. Method according to claim 1, wherein the flow rate of the regenerating loop exceeds the flow rate in said scrubbing loop by a factor in the range from about 2 to about 5.

3. Method according to claim 2, wherein said factor is about 3.

4. Method according to claim 1, wherein said step of aerating the contaminated washing liquid in the regenerator (59) comprises
   maintaining said regenerator at a pressure which exceeds standard atmospheric pressure; and
   continuously drawing off a stream (68) of said aerated washing liquid from said regenerator (59) in a third loop comprising a degassing loop including a recirculating stream from said regenerator (59) to a desorber (69) and to said reservoir (27; 33) for degassing in the desorber (69) the resulting aerated liquid to substantially atmospheric pressure, and venting the resulting gas through a vent (73) into ambient air.

5. Method according to claim 4, further including drawing off a stream of said aerated washing liquid from one part of the regenerator (59) and circulating the drawn-off liquid in a stream comprising a fourth loop comprising a re-aearating loop which recycles said stream back to said regenerator (59).

6. Method according to claim 4, wherein the flow rate of said stream in said regenerating loop exceeds the flow rate of the stream of the scrubbing loop by a factor in the range of about 2 to 5.

7. Method according to claim 5, wherein the flow rate of said stream in said regenerating loop exceeds the flow rate of the stream of the scrubbing loop by a factor in the range of about 2 to 5.

8. Method according to claim 6, wherein the flow rate of said stream in said degassing loop exceeds the flow rate of the stream of the scrubbing loop.

9. Method according to claim 7, wherein the flow rate of said stream in said degassing loop exceeds the flow rate of the stream of the scrubbing loop.

10. Method according to claim 4, wherein the hyperbaric pressure in the regenerator (59) is in the range of about 1 to 2.5 bar.

11. Method according to claim 10, wherein said range is about 1.3 to 2.2 bar.

12. Method according to claim 4, wherein the hyperbaric pressure in the regenerator (59) is about 1.8 bar.

13. Method according to claim 5, wherein the hyperbaric pressure in the regenerator (59) is in the range of about 1 to 2.5 bar.

14. Method according to claim 13, wherein said range is about 1.3 to 2.2 bar.

15. Method according to claim 5, wherein the hyperbaric pressure in the regenerator (59) is about 1.8 bar.

16. Method according to claim 4, wherein the flow rate of said stream (68) in the third loop from the regenerator (59) to the desorber (69) exceeds the flow rate of the stream in the first loop by a factor of about 3.

17. Method according to claim 5, wherein the flow rate of said stream (68) in the third loop from the regenerator (59) to the desorber (69) exceeds the flow rate of the stream in the first loop by a factor of about 3.

18. Method according to claim 6, wherein the flow rate of said stream (68) in the third loop from the regenerator (59) to the desorber (69) exceeds the flow rate of the stream in the first loop by a factor of about 3.

19. Method according to claim 7, wherein the flow rate of said stream (68) in the third loop from the regenerator (59) to the desorber (69) exceeds the flow rate of the stream in the first loop by a factor of about 3.

20. Method according to claim 5, wherein the flow rate of liquid passing through said regenerator (59) including the fourth or reaerating loop is about 5 times the flow rate of the stream of liquid in the first or scrubbing loop, and the flow rate in the third loop is about 3 times the flow rate in the first loop.

* * * * *